US007805985B2

(12) United States Patent
Friedl et al.
(10) Patent No.: US 7,805,985 B2
(45) Date of Patent: Oct. 5, 2010

(54) METHOD FOR DIAGNOSING THE LEAKAGE OF AN INJECTOR AND ASSOCIATED CONTROL DEVICE

(75) Inventors: Günter Friedl, Regensburg (DE); Carlos Eduardo Migueis, Tegernheim (DE); Oswald Schumann, Rettenbach (DE)

(73) Assignee: Continental Automotive GmbH, Hannover (DE)

( * ) Notice: Subject to any disclaimer, the term of this patent is extended or adjusted under 35 U.S.C. 154(b) by 265 days.

(21) Appl. No.: 12/116,488

(22) Filed: May 7, 2008

(65) Prior Publication Data

US 2008/0302176 A1 Dec. 11, 2008

(30) Foreign Application Priority Data

May 8, 2007 (DE) ....................... 10 2007 021 594

(51) Int. Cl.
*G01M 15/04* (2006.01)

(52) U.S. Cl. .................................................. 73/114.45

(58) Field of Classification Search ............. 73/114.38, 73/114.45, 114.46, 114.47, 114.48, 114.49, 73/114.51, 114.52
See application file for complete search history.

(56) References Cited

U.S. PATENT DOCUMENTS

| | | | | |
|---|---|---|---|---|
| 5,611,314 | A * | 3/1997 | Fuwa et al. | 123/491 |
| 2002/0112528 | A1 * | 8/2002 | Antonioli et al. | 73/49.7 |
| 2005/0005880 | A1 * | 1/2005 | Bale et al. | 123/90.11 |

* cited by examiner

*Primary Examiner*—Eric S McCall
(74) *Attorney, Agent, or Firm*—King & Spalding L.L.P.

(57) ABSTRACT

In order to diagnose the leakage of an injector (IN1) which serves for injecting fuel into the combustion chamber of at least one cylinder (CY1) of a combustion engine (CE), it is detected, in an observation time window (OPS2) during which the particular injector (IN1) of the combustion engine (CE) that is to be tested is deactivated, whether a deviation (DV) of the speed curve (GS2) of the combustion engine (CE) has occurred relative to a reference speed curve (GS1) which indicates injector leak-tightness. In the event that a deviation (DV) is detected, it is concluded that there is a leakage of the injector (IN1).

10 Claims, 5 Drawing Sheets

METHOD FOR DIAGNOSING THE LEAKAGE OF AN INJECTOR AND ASSOCIATED CONTROL DEVICE

CROSS-REFERENCE TO RELATED APPLICATIONS

This application claims priority to German Patent Application Number 10 2007 021 594.2 filed on May 8, 2007, and which is incorporated herein by reference in its entirety.

TECHNICAL FIELD

The present invention concerns a method and device for diagnosing the leakage of a fuel injector.

BACKGROUND

In practice increased hydrocarbon emissions can be produced in the case of e.g. a spark ignition engine with direct gasoline injection due to leakage of one or more injectors as a result of the fact that fuel drips unchecked from the respective leaky injector into the combustion chamber of its associated cylinder and is not properly combusted there. In particular when the engine is started or immediately when or after the engine is switched off, fuel dripping from the respective leaky injector into the combustion chamber of its associated cylinder can then be discharged completely or partially as unburnt hydrocarbon into the environment via the exhaust and/or induction system of the spark ignition engine. Furthermore, an injector leakage of this kind can lead, during the respective combustion cycle of the spark ignition engine, to the unregulated delivery of fuel into the combustion chamber of that cylinder on which a leaky injector is mounted. Moreover, the starting behavior of the spark ignition engine can be impaired by such an injector leakage, since the fuel delivery control phase is impinged on by a leaky injector with an unknown, uncontrollable fault. Similar difficulties due to injector leakage can also occur with other combustion engines with direct fuel injection such as e.g. diesel engines. In addition to or independently of this, a combustion engine which has one or more injectors for a port injection in its at least one intake manifold can also be affected by this.

Although in practice the increased emissions caused by leakage of an injector can be diagnosed in principle, it has not been possible until now to trace back said emissions causally to a specific fault in a motor vehicle having a combustion engine of said type. In addition a different starting behavior of the respective combustion engine can occur without a repair shop being able to give a satisfactory answer and clearly identify a fault to customers in the event of complaints.

SUMMARY

A possible leakage or lack of leak-tightness of at least one injector of a combustion engine can be unequivocally detected and/or diagnosed in a simple and reliable manner according to an embodiment of a method for diagnosing the leakage of an injector which serves for injecting fuel into a combustion chamber of at least one cylinder of a combustion engine, in which in an observation time window during which the particular injector of the combustion engine that is to be tested is deactivated, detecting whether a deviation of a speed curve of the combustion engine has occurred relative to a reference speed curve which indicates injector leak-tightness, and in the event that a deviation is detected, determining that there is a leakage of said injector. According to another embodiment, a control device for diagnosing the leakage of an injector which serves for injecting fuel into the combustion chamber of at least one cylinder of a combustion engine, may comprise a diagnostic unit operable to detect, in an observation time window during which the particular injector of the combustion engine that is to be tested is deactivated, whether a deviation of a speed curve of the combustion engine has occurred relative to a reference speed curve which indicates injector leak-tightness, and in the event that a deviation is detected, is further operable to determine that there is a leakage of said injector.

According to a further embodiment, in a first observation time window which lies in a period of time between an activation time of a starter unit of the combustion engine for the purpose of rotating its crankshaft and an activation time of an ignition system of the combustion engine, an engine speed of the combustion engine can be observed during the latter's starting operation, and in said first observation time window a leakage of the particular injector that is to be tested can be diagnosed if a speed increase above a calibration threshold is registered in the first observation time window, said calibration threshold being chosen greater than a target speed of the combustion engine attainable by the starter unit on its own. According to a further embodiment, in a second observation time window which lies in a period of time between the activation time of the ignition system of the combustion engine and an activation time of an injection control system of the combustion engine, an engine speed of the combustion engine can be observed during the latter's starting operation, and a leakage of the particular injector that is to be tested can be diagnosed if a speed increase above a calibration threshold is registered in the second observation time window, said calibration threshold being chosen greater than a target speed of the combustion engine attainable by a starter unit on its own. According to a further embodiment, the diagnosis can be stopped as soon as the fuel injection of at least one injector is released. According to a further embodiment, during a third observation time window which lies in the period of time between a time of a deactivation of all injectors of the combustion engine and a time of the deactivation of the ignition system of the combustion engine, the decrease in an engine speed can be observed, and the leakage of the particular injector that is to be tested can be diagnosed if during said third observation time window the engine speed exceeds a calibration threshold which is greater than the values of the engine speed if the injector is leak-tight.

BRIEF DESCRIPTION OF THE DRAWINGS

The invention and its developments are explained in more detail below with reference to drawings, in which.

Elements having the same function and mode of operation are identified by the same reference signs in each case in FIGS. 1 to 5 inclusive.

DETAILED DESCRIPTION

As stated above, in a method for diagnosing the leakage of an injector which serves for injecting fuel into the combustion chamber of at least one cylinder of a combustion engine, it is detected, in an observation time window during which the particular injector of the combustion engine that is to be tested is deactivated, whether a deviation of the speed curve of the combustion engine has occurred relative to a reference speed curve which indicates injector leak-tightness, and in the event of a deviation being detected, it is concluded that there is a leakage of said injector.

Owing to the fact that it is detected, in the at least one observation time window during which the particular injector of the combustion engine that is to be tested is deactivated, whether a deviation of the speed curve of the combustion engine has occurred relative to a reference speed curve which indicates injector leak-tightness, the leakage, i.e. a lack of leak tightness, of said injector can be concluded as the fault cause in the event of a deviation being detected. In this way, in the event of a possible increase in the occurrence of hydrocarbon emissions, a diagnosis or troubleshooting can be performed in a simple and reliable manner in order to determine whether the increased emissions can be traced back causally to the leakage of one or more injectors of the combustion engine. It is thus possible to detect and where appropriate to repair possibly defective injectors or to replace them with correctly functioning injectors. By means of this diagnostic capability it is ensured that the cause of possibly increased emissions can be determined, i.e. found, at an early stage. This facilitates the removal of the cause of the fault in the engine and consequently the effective fulfillment of or compliance with statutory emission regulations. Furthermore, this consequently also allows abnormal starting operations which could otherwise lead to losses in comfort, such as e.g. too abrupt, jerky starting, to be largely avoided.

According to another embodiment, a control device for diagnosing the leakage of an injector which serves for injecting fuel into the combustion chamber of at least one cylinder of a combustion engine, may comprise a diagnostic unit which detects, in an observation time window during which the particular injector of the combustion engine that is to be tested is deactivated, whether a deviation of the speed curve of the combustion engine has occurred relative to a reference speed curve which indicates injector leak-tightness, and in the event of a deviation being detected, concludes that there is a leakage of said injector.

Figure 1:
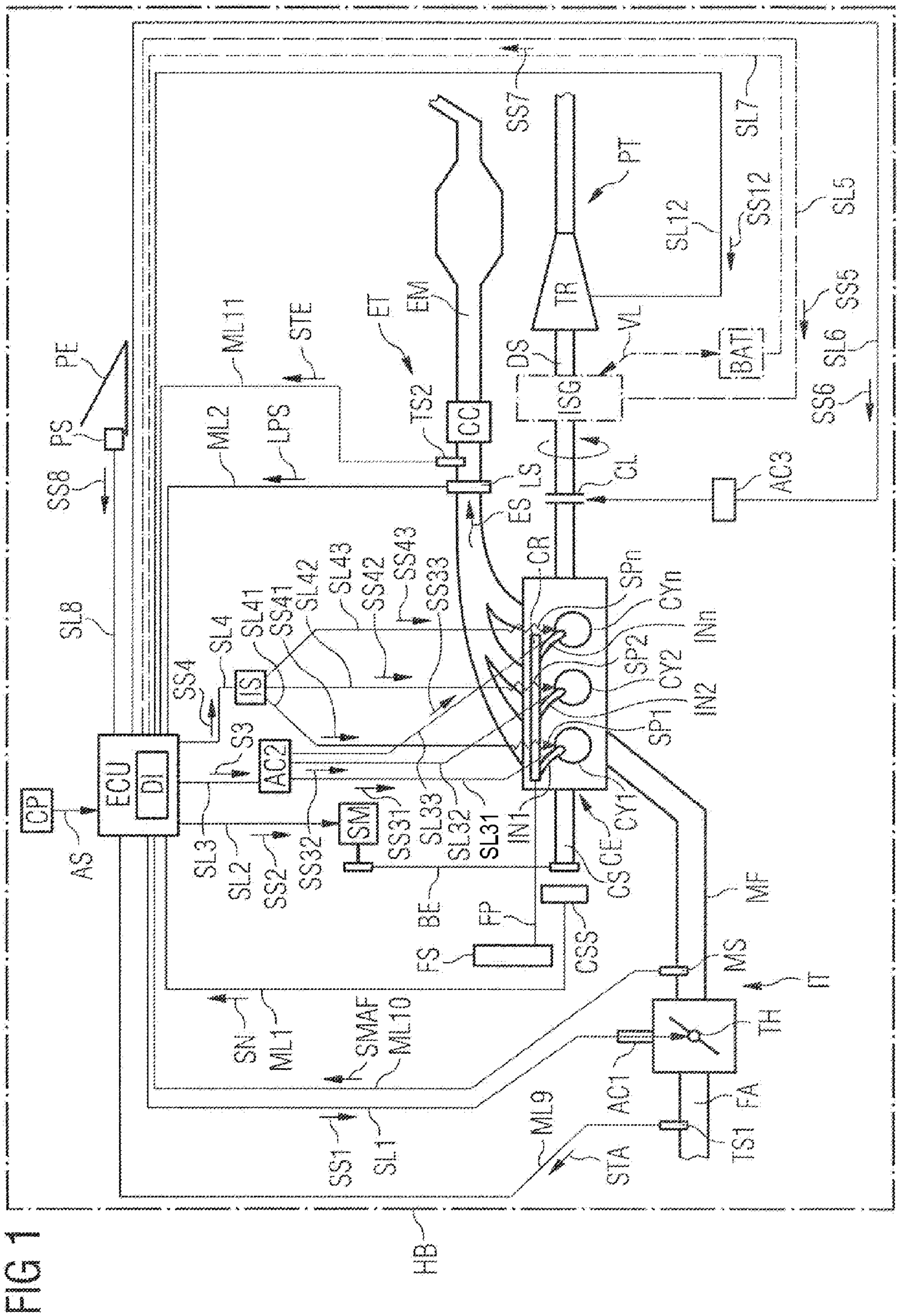
FIG. 1 schematically represents an exemplary embodiment of a power train of a motor vehicle, wherein the latter's engine control device diagnoses a possible leakage of at least one injector according to different embodiments of the diagnostic method, FIG. 2 schematically represents a flowchart for detecting injector leakage according to two embodiments of diagnostic methods during the starting operation of the combustion engine from FIG. 1, FIG. 3 schematically represents a speed (rpm) diagram for illustrating the two diagnostic methods from FIG. 2 during the engine starting operation, FIG. 4 schematically represents a diagnostic flowchart for detecting a possible injector leakage according to a further diagnostic embodiment of the method during the switching-off operation of the combustion engine from FIG. 1, and FIG. 5 schematically represents a speed curve which is evaluated in accordance with the diagnostic method from FIG. 4 during the switching-off operation of the combustion engine from FIG. 1 in a specific observation time window and referred to for diagnosing an injector leakage that may be present.

FIG. 1 shows in a schematic overview diagram the power train PT of a motor vehicle HB. Said power train comprises a combustion engine CE. The latter is preferably embodied as a spark ignition engine with direct injection. A control device ECU is provided for activating as well as for adjusting or controlling the fuel combustion process of the combustion engine or the deactivation thereof.

When the driver of the motor vehicle HB actuates a starter unit CP such as, for example, a starter button or turns his/her driver key in the ignition lock of the vehicle HB, a corresponding activation signal AS is transmitted to the control device ECU. The control device ECU thereupon switches on an ignition system IS by means of a control signal SS4 via a control line SL4. By way of electrical lines SL41, SL42, SL43 the ignition system IS controls ignition elements, in particular spark plugs SP1 to SPn inclusive, by means of ignition signals SS41, SS42, SS43 according to the timing sequence of the combustion cycles of the cylinders CY1 to CYn inclusive of the combustion engine CE. The individual ignition elements SP1 to SPn inclusive are associated with the combustion chambers of the cylinders CY1 to CYn inclusive. They serve for the respective ignition of a fuel/air mixture introduced there prior to the execution of the respective power stroke of the combustion cycle. At least one injector IN1 to INn inclusive is mounted on the respective cylinder CY1 to CYn inclusive for the purpose of metering fuel into the combustion chamber of the respective cylinder CY1 to CYn inclusive. Each individual injector IN1 to INn inclusive is activated or deactivated with the aid of an injection control system AC2 by means of control signals SS31, SS32, SS33 by way of control lines SL31, SL32, SL33 in a predefinable sequence according to the desired combustion cycle. In this arrangement the injection system AC2 is controlled by the control device ECU by means of control signals S3 by way of the control line SL3. The injectors IN1 to INn directly injecting fuel are connected to a common high-pressure fuel line CR, in particular to what is referred to as a "common rail". The latter is supplied with fuel, in particular gasoline, via a fuel pipe FP from a fuel reservoir FS, in particular a fuel tank.

In order to start the combustion engine CE, the control device ECU switches on a starter unit SM by means of a control signal SS2 by way of a control line SL2. The starter unit SM is coupled to the crankshaft CS of the combustion engine CE and acts as an auxiliary power plant driving the crankshaft for the purpose of starting the combustion process of the combustion engine. In particular what is referred to as a belt-driven starter/generator can be provided as a starter unit. This is mechanically linked directly to the crankshaft CS via a drive belt BE. After the starting operation of the combustion engine CE the starter unit SM may be advantageously deactivated again, i.e. switched off, by the control device ECU. During the starting operation the starter unit SM can be set by the control device ECU by means of the control signals SS2 in particular such that a predefinable reference torque is applied to the crankshaft CS by the starter unit SM in order to reach a specific target torque.

Which operating mode is selected during the running combustion operation of the combustion engine CE on the part of the control device ECU, and which torque is applied to the driveshaft or crankshaft CS by the combustion engine, is dependent on a plurality of status parameters of the vehicle HB as well as in particular on the reference drive torque that is desired by the driver currently as the overall drive torque to be made available. The following influencing variables may be included as examples of status parameters of the motor vehicle HB: warming-up phase, startup phase, acceleration phase, braking phase, exhaust emission values, miles per gallon, etc. A specific reference drive torque is requested by the driver of the motor vehicle HB by actuating the accelerator pedal PE or a corresponding control unit. In this case the position of the accelerator pedal PE is converted by means of a sensor PS into a request signal SS8 and transmitted to the control device ECU by way of a control line SL8. From the control signal SS8, which is representative of the reference drive torque desired at a given time by the driver, and from further operating variables of the vehicle HB, the control device ECU determines which air flow rate is present in the intake manifold MF of the air induction tract IT of the combustion engine CE and which fuel quantity is injected into the combustion chamber of the respective cylinder CY1 to CYn inclusive by the injectors IN1 to INn inclusive. The throttle valve TH can be controlled electrically or mechanically by the control device ECU via an actuating element AC1 by means of control signals SS1 by way of a control line SL1 in order to move the throttle valve TH into such a position that overall the desired reference drive torque is released by the combustion engine CE to its crankshaft CS. The control or regulation of the throttle valve TH is accompanied by a corresponding setting of the fuel metering or fuel injection for the individual cylinders CY1 to CYn inclusive of the combustion engine CE by their injectors IN1 to INn inclusive. In order to adjust the throttle valve TH, use is made in particular of what is referred to as an intake manifold model, as specified for example in the book by Van Bashuysen/Schafer, 3rd edition, April 2005, title: Handbuch Verbrennungsmotor ("Combustion engine manual"), section 16.8.1. For the purpose of intake manifold modeling the temperature of the fresh air FA aspirated into the air intake tract IT is measured by means of an input-side temperature sensor TS1 and a measurement signal STA representing the current air intake temperature generated therefrom. Said measurement signal is transmitted to the control device ECU via a measurement line ML9. Also provided in or at the intake manifold MF of the air intake tract IT of the combustion engine CE is in particular an air mass sensor MS which, disposed downstream of the throttle valve TH, measures the air mass flowing into the intake manifold MF and transmits measurement signals SMAF to the control device ECU via a measurement line ML10. In particular a speed measuring unit CSS can also be used to obtain measurement signals SN which are representative of the rotational speed N of the crankshaft CS. Said measurement signals SN are transmitted to the control device ECU via a measurement line ML1. Further engine operating parameters which are specific to the consumption cycle of the combustion engine, such as e.g. the coolant temperature of the coolant in the cooling circuit of the combustion engine CE, or the position of air inlet valves, fuel injection valves, exhaust valves etc. of the cylinders CY1 to CYn inclusive of the combustion engine CE, are transmitted via at least one further signal line or a common bus system by means of one or more information signals. These have been omitted in this case from the drawing in FIG. 1 for the sake of simplicity.

In combustion operation of the combustion engine CE, exhaust gases are expelled on each outlet stroke of the respective cylinder CY1 to CYn inclusive and guided along in a downstream common exhaust tract ET which is assigned to all cylinders collectively. In the process the exhaust gases discharged from each cylinder CY1 to CYn inclusive are combined by means of an exhaust manifold EM into an exhaust gas stream ES and fed to a catalytic converter CC in the exhaust tract ET. If necessary, more than one catalytic converter can also be provided in the exhaust tract. Provided upstream of the catalytic converter CC for the purposes of lambda (λ) control of the combustion process of the combustion engine CE is a λ probe LS which supplies measurement signals LPS to the control device ECU via a measurement line ML2. Between the lambda probe LS and the catalytic converter CC there is preferably disposed a temperature sensor TS2 with the aid of which measurement signals STE for the current exhaust gas temperature of the exhaust gas stream ES at which said exhaust gas stream is fed to the catalytic converter CC are transmitted to the control device ECU via a measurement line ML11. Instead of this direct temperature measurement using a temperature sensor TS2 it may also be possible to refer to an exhaust gas temperature model in the control device ECU for the purpose of determining the exhaust gas temperature. In that case the temperature sensor TS2 can then advantageously be omitted.

Instead of the individual control and measurement lines for the different components of the power train PT, in particular for its actuators or final control elements and/or sensors, it can be advantageous in certain circumstances to provide at least one data bus system or other information transmission system.

By determining the exhaust gas temperature it is verified whether the catalytic converter CC has reached what is termed its "light-off" temperature, i.e. reaction temperature, and is able to convert raw emission components in the exhaust gas stream ES to a sufficient extent into comparatively harmless or less harmful exhaust gas components than in the case of untreated raw emissions, i.e. without catalytic converter cleaning, and thus operate efficiently. Until the characteristic "light-off" temperature of the catalytic converter CC has been reached, toxic raw emission components, in particular in the form of HC, CO and $NO_x$ pollutant components, continue to accumulate.

The temperature of the exhaust gas stream ES preferably serves to adjust the throttle valve TH and the fuel injection system IS by means of the control device ECU in such a way that an optimal reduction in fuel emissions is effected.

The coupling or decoupling of the crankshaft CS of the combustion engine CE to or from the driveshaft DS by means of a clutch CL is likewise handled by the control device ECU. For that purpose the control device ECU transmits one or more control signals SS6 by way of at least one control line SL6 to an actuator AC3 for the clutch CL. In a similar manner the control device ECU makes use of one or more control signals SS12 to control the transmission TR of the power train PT by way of at least one control line SL12 via a desired gear selection.

The vehicle HB can advantageously be embodied as a hybrid vehicle. To that end, in addition to the combustion engine CE it has an electrical drive/braking unit ISG in the power train PT. Said drive/braking unit is preferably embodied as what is known as an integrated starter generator. The optional electrical drive/braking unit ISG is indicated by a dash-dotted line in the drawing in FIG. 1. In said hybrid vehicle HB, on the one hand a torque can be applied to the driveshaft DS of the power train PT solely, i.e. exclusively, by means of the crankshaft CS of the combustion engine CE. In this case the electrical drive/braking unit ISG is deactivated and decoupled from the driveshaft DS. On the other hand, independently of the combustion engine CE, a drive torque can be applied to the driveshaft DS solely, i.e. exclusively, by means of the electrical drive/braking unit ISG. In this case the electrical drive/braking unit acts in particular as an electric motor, i.e. electromotor. In this case of purely electrical vehicle operation the clutch CL, which is disposed between the combustion engine CE and the electrical drive/braking unit ISG, is disengaged by means of the final control element or actuator AC3 in order to decouple the crankshaft CS of the combustion engine CE from the driveshaft DS. In the case of pure combustion operation, on the other hand, the clutch CL is engaged with the aid of the actuator AC3 in order to couple the combustion engine CE to the driveshaft DS of the power train PT for the purpose of applying torque. Furthermore the combustion engine CE and the electrical drive/braking unit ISG can also be brought by the control device ECU into a combination operating mode in which the combustion engine CE and the electrical drive/braking unit ISG are in operation simultaneously and drive the driveshaft DS of the power train PT together, i.e. in combination. By means of control signals SS5 of the control device ECU the first electrical drive/braking unit ISG can be activated or deactivated by way of a control line SL5, its torque application set, and/or its operating mode selected between electric motor operation and generator operation.

In order to recover energy during the generator operating mode of the electrical drive/braking unit ISG, the latter is connected by way of at least one supply line VL to at least one energy store BAT, in particular at least one battery or the like. The energy store BAT and an associated connecting lead VL are indicated by a dash-dotted line in the drawing in FIG. 1. With the aid of the energy store BAT the electrical drive/braking unit ISG can be operated as a generator e.g. during braking of the hybrid vehicle and braking energy regeneratively stored in the energy store BAT. Conversely, electrical energy can be drawn off from said energy store BAT in order to power the electrical drive/braking unit ISG when the control device ECU operates the electrical drive/braking unit ISG as an electric motor in order to actively apply a specific electrical driving torque to the driveshaft DS. In order to enable the control device ECU to be provided with information about the charge status of the energy store BAT, the latter is coupled to the control device ECU via a data line SL7. By way of said data line SL7 it is possible in particular to transmit one or more status signals SS7 for a charge status parameter which are representative of the respective charge status of the energy store BAT. The respective charge status parameter is incorporated in the operating control or operating regulation of the electrical drive/braking unit ISG by the control device ECU. In this way the control device ECU checks for example whether the charge status of the energy store BAT lies above a minimum threshold and is not yet completely discharged. Only if this is the case does the control device ECU switch the electrical drive/braking unit ISG into the electromotive operating mode. For the generator operating scenario of the electrical drive/braking unit ISG, on the other hand, a check is performed by the control device ECU to determine whether an upper threshold value for the charging of the energy store BAT has been reached or exceeded. Only if the energy store has not yet been fully charged, i.e. the charge status parameter has not yet exceeded this upper threshold value, does the control device ECU switch the first electrical drive/braking unit ISG into the generator operating mode.

If the electrical drive/braking unit ISG is integrated in the power train PT, it can sometimes be beneficial to use it as the starter unit for starting the combustion engine CE. The starter unit SM can then advantageously be dispensed with.

In order to be able now to diagnose a possible leakage of at least one injector from the plurality of injectors IN1 to INn inclusive, it is detected, in at least one observation time window during which the particular injector of the combustion engine that is to be tested or checked is deactivated, whether a deviation of the speed curve of the combustion engine has occurred relative to a reference speed curve which indicates injector leak-tightness, and in the event of a deviation being detected it is concluded that there is a leakage of said injector. This diagnosis is performed in particular using a diagnostic unit DI in the control device ECU. Alternatively thereto, this diagnostic function can also be performed, where appropriate, by a separate diagnostic device which is connected to the control device ECU. In order to perform the diagnosis of possible leakage of at least one injector such as e.g. IN1 from the plurality of injectors IN1 to INn inclusive of the combustion engine CE, the observation time window for observing the speed curve of the combustion engine is preferably placed in a period of time during which the engine is being started or switched off.

Figure 2:
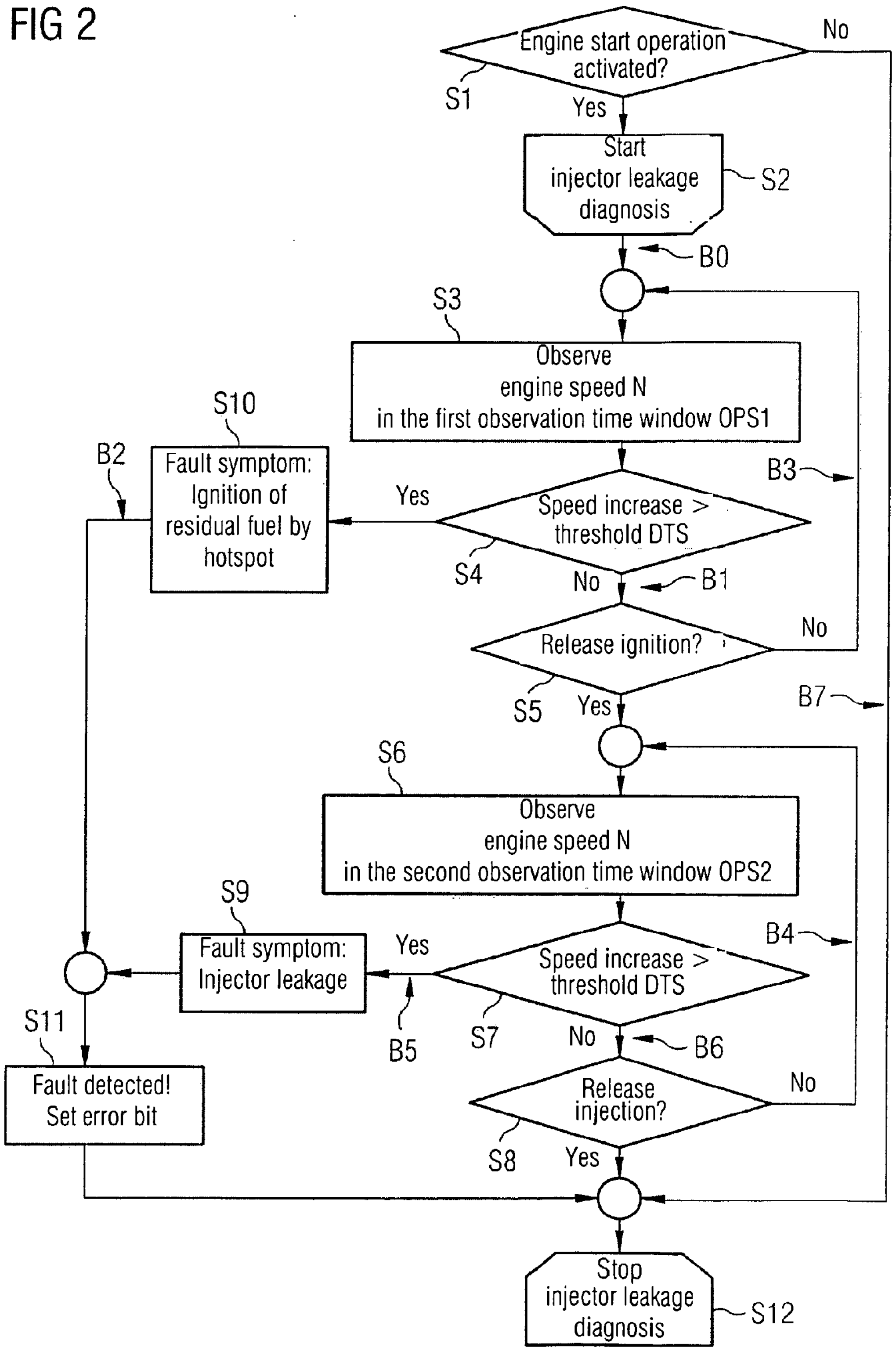
Figure 3:
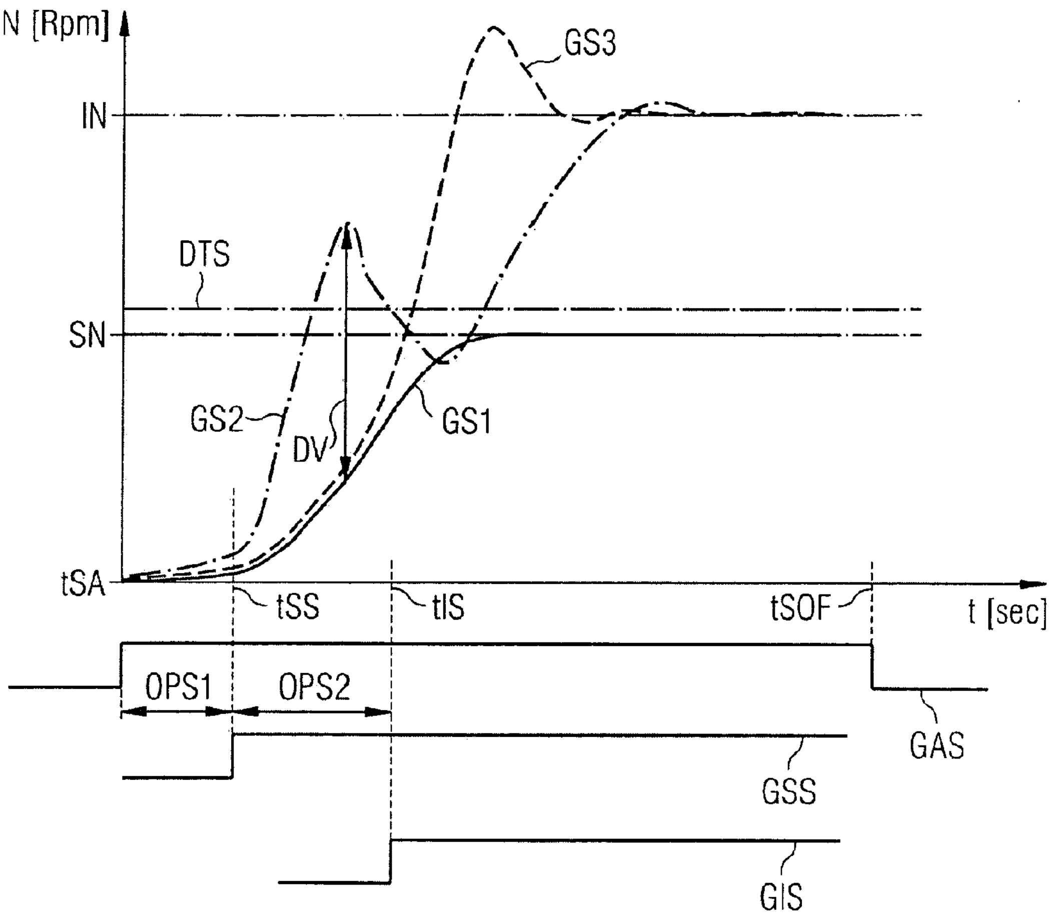

FIG. 2 illustrates an embodiment of a diagnostic method for use during the starting operation of the combustion engine CE for detecting a possible leakage which is traced back to an injector or possibly also several injectors, with reference to a schematic flowchart. In the first step S1 the diagnostic unit DI checks in the diagnostic path B0 whether the engine starting operation is activated or deactivated. If it is recognized in step S1 that no engine starting operation has been activated, the diagnostic sequence jumps via the path B7 to step S12 and at that point stops the diagnosis in respect of injector leakage. If, however, e.g. the starter button CP (see FIG. 1) is pressed by the driver or the vehicle key in the ignition lock of the vehicle is turned to an active position, a control signal AS representative thereof is registered by the control device ECU. By means of the latter the activation of the engine starting operation at time tSA is detected by the diagnostic unit DI and in a step S2 the actual diagnosis in respect of possibly present injector leakages, i.e. leakages of the injectors IN1 to INn inclusive, is started. For this purpose, in a first observation time window OPS1 which lies in the period between the activation time tSA (see FIG. 3) of the starter unit such as e.g. SM of the combustion engine CE for starting its crankshaft CS and the activation time tSS of the ignition system IS of the combustion engine CE, the engine speed N of the combustion engine CE is observed in diagnostic step S3 during the latter's starting operation. This first observation time window OPC1 between the activation time tSA of the starter unit SM and the activation time tSS of the ignition system IS is shown in the speed (rpm) diagram of FIG. 3. There, the time t is plotted in seconds along the abscissa and the engine speed N is plotted in Rpm ("rotations/revolutions per minute") along the ordinates of the speed diagram. Starting at the activation time tSA the starter unit SM applies a starter torque to the crankshaft CS of the combustion engine CE in such a way that the speed N of the crankshaft CS increases, starting from the stationary speed N=0 Rpm at crankshaft standstill, i.e. when the crankshaft is stationary. If the starter unit SM were to drive the crankshaft CS further on its own, without the combustion engine CE starting and commencing its combustion operation, the crankshaft CS would reach a maximum target speed SN produced solely by the application of torque by the starter unit SM. The speed curve attainable by the starter unit SM alone is illustrated in FIG. 3 with the aid of an unbroken line labeled with the reference sign GS1. The target speed SN is marked in FIG. 3 by means of a dash-dotted horizontal line. The switching time characteristic for the activation or actuation of the starter unit SM is indicated schematically beneath the speed diagram of FIG. 3 with the aid of a step curve GAS. As of the start time tSA the starter unit SM is switched on and is not switched off again until a time tSOF after reaching the target speed SN. The starter unit SM is switched off for example by releasing the starter button CP or turning the ignition key back into its initial position.

If a speed increase above a calibration threshold DTS now occurs already in this first observation time window OPS1, said calibration threshold advantageously being chosen greater than the target speed SN of the combustion engine CE attainable by the starter unit SM on its own, this indicates an injector leakage for at least one injector IN1 to INn. This diagnostic result can occur in particular during what is termed the warm-starting of the combustion engine CE, i.e. when the latter has been switched off warm after a journey and is still very hot. This is because injector leakage, i.e. lack of leak-tightness of at least one injector, can cause fuel to seep into the combustion chamber of its associated cylinder and be ignited there by what are termed "hotspots". An additional accelerating displacement moment is exerted onto the piston in this cylinder by the combustion process which is then triggered. As this piston is connected to the crankshaft CS, an additional torque due to the combustion process caused by injector leakage in this cylinder is applied to the crankshaft CS.

The calibration threshold DTS is preferably defined in the range between the maximum target speed SN which can be attained by the starter unit SM on its own and a predefined idling speed IN which is desired for the idle running of the combustion engine after the combustion engine CE has been started with the starter unit deactivated.

If a speed increase above the calibration threshold DTS is registered in the first observation time window OPS1 by the diagnostic unit DI in step S4 of FIG. 2, the fault symptom "ignition of residual fuel by hotspots" is deduced in the branch path B2 in diagnostic step S10 and an error bit indicating same is set in the following diagnostic step S11. Finally, in diagnostic step S12, the fault diagnosis in respect of possible leakages of at least one injector during the first observation time window is stopped.

Here in the exemplary embodiment (see FIG. 3) no speed increase above the threshold was observed, i.e. detected, in step S4 during the first observation time window OPS1. This is the case in particular when what is termed a cold start of the combustion engine CE is performed. Thus, if the calibration threshold DTS is not exceeded during the first observation time window OPS1, a branch is made into a diagnostic branch path B1 of the flowchart of FIG. 2. In the diagnostic branch B1 of FIG. 2, following step S4 a check is made in step S5 to determine whether the ignition system IS has been released, i.e. is activated. If this is not the case, the diagnosis in respect of injector leakage is restarted after a pass through a feedback branch B3 in step S3 by observation of the engine speed N in the first observation time window OPS1.

If the check in step S5 reveals that the ignition system IS was released, i.e. activated, at time tSS, in a second observation time window OPS2 which lies in a period between the activation time tSS of the ignition system IS of the combustion engine CE and the activation time tIS of the injection control system AC2 of the combustion engine CE, the engine speed N of the combustion engine CE is observed in diagnostic step S6 during the latter's starting operation. This second observation time window OPC2 with its starting time tSS from the switching-on of the ignition system IS to the activation of the injection control system AC2 at time tIS is shown in FIG. 3. The step-like activation/deactivation switching curve for the ignition system IS is identified there by GSS. The time characteristic of the switching status of the injection control system AC2 is drawn in beneath the speed diagram of FIG. 3 and identified by GIS. From the activation time tIS of the injection control system AC2 a specific fuel quantity is injected in each case into the combustion chamber of the respectively associated cylinder CY1 to CYn by at least one injector IN1 to INn.

If the speed N remains below the calibration threshold DTS during the second observation time window OPC2, which condition is checked or queried by the diagnostic unit DI in step S7, this indicates that the injectors IN1 to INn inclusive are operating correctly. In that case no injector leakage, i.e. no undesirable leaking of at least one injector, could be registered. The speed curve in this case is shown as a dashed line in FIG. 3 and identified by GS3. In the flowchart of FIG. 2 the diagnostic sequence then branches into a branch path B6. There, a check is made in step S8 to determine whether the injection of the injection system IS has possibly been released. If this is not the case, the diagnostic sequence jumps back via a feedback path B4 to step S6 again and continues to observe the engine speed in the second observation time window OPS2 for possible exceeding of the calibration threshold DTS. If, after starting the crankshaft CS of the combustion engine CE by means of the starter unit SM and after igniting at time tSS by the ignition system IS and after time tIS from activation of the injection of fuel by the fuel injection system AC2, the start of combustion of the combustion engine CE occurs, i.e. a continuous combustion cycle gets under way, the combustion engine CE then increases its revolutions until it reaches the desired idling speed IN. In this case the leakage diagnosis is finally terminated in step S12 after the release of the injection has been registered in step S8.

If, however, it is registered in step S7 that the crankshaft CS reaches a speed N above the calibration threshold DTS in the second observation time window OPS2, an injector leakage of at least one injector is indicated thereby. This is diagnosed in branch B5 of the diagnostic sequence of FIG. 2 in step S9 and the fault symptom "injector leakage" output. To indicate this, an error bit is set by the diagnostic unit DI in step S11 and finally the diagnosis in respect of injector leakage is stopped in step S12. The speed increase caused by an injector leakage of this kind is illustrated by way of example in FIG. 3 by a dash-dotted curve GS2. This lies above the curve GS1. In the second observation time window OPS2, prior to the activation of the fuel injection system AC2 at time tIS, a speed increase above the calibration threshold DTS occurs, i.e. in the second observation time window OPS2 the speed values exceed the calibration threshold DTS. This indicates that at least one injector, in particular e.g. that injector which is associated with that cylinder for which a first fuel metering or injection is provided at engine startup time, has an injector leakage, i.e. is not leak-tight. This causes fuel to drip into its associated combustion chamber, thereby resulting as of the time tSS after the activation of the ignition in the combustion of the fuel that has leaked into this cylinder. In this way a torque effected due to a combustion process is produced in addition to the pure starter torque. Expressed in other words, a deviation DV of the speed curve GS2 of the combustion engine CE takes place relative to the reference speed curve GS1 which would be present in the case of ideal injector leak-tightness. On account of the deviation DV it can therefore be concluded conversely that at least one injector from the totality of injectors of the combustion engine has a leakage. This enables the cause of possible pollutant emissions that were detected e.g. during the starting operation or continuous operation to be unequivocally identified. In particular it can be advantageously avoided from the outset by means of the diagnostic test that the vehicle will continue to be operated unnoticed with a leaky injector. In particular upon detection of an injector leakage a fault lamp can be activated for this purpose or some other warning signal can be output.

At the beginning of the test routine to check for injector leakage at engine startup time it is also beneficial to rule out the case of a repeated cold start in which the preceding engine deceleration phase from the preceding switch-off operation to the engine restart was too short for the engine to have essentially or virtually come to a standstill. After the combustion engine CE has been switched off, when the engine is restarted the test routine of FIG. 2 may be advantageously restarted in the diagnostic unit DI at step S1.

Figure 4:
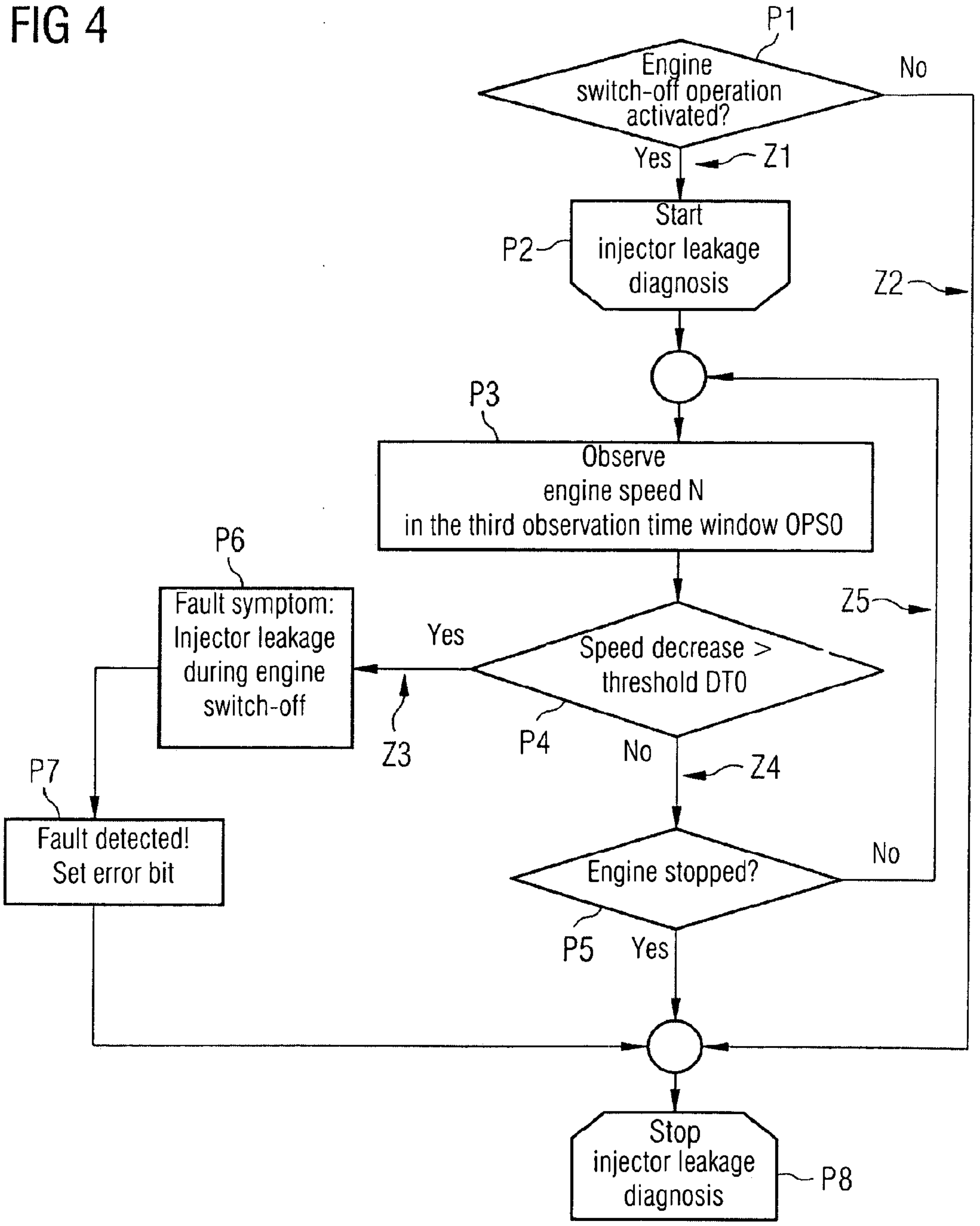
Figure 5:
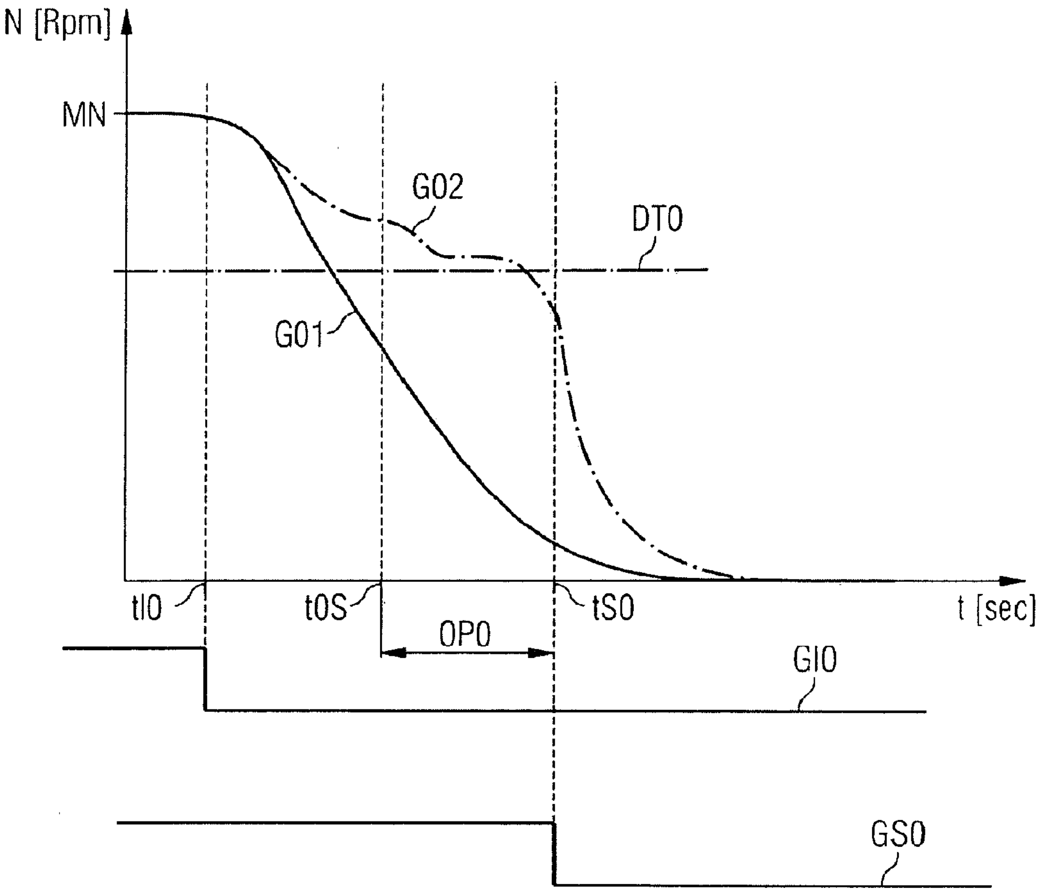

Alternatively to the diagnosis in respect of injector leakage at engine startup, it can also possibly be advantageous to perform a diagnosis in respect of injector leakage when the engine is switched off. FIG. 4 shows a favorable diagnostic sequence with the aid of a flowchart. If the diagnostic unit DI detects in the diagnostic branch Z1 in the first step P1 that an engine switch-off operation has been activated, then in step P2 it initiates the start of the diagnosis in respect of injector leakage. The engine switch-off operation is initiated in particular by the time tI0, from which all injectors IN1 to INn inclusive of the combustion engine have been deactivated, i.e. switched off, by the fuel injection system AC2. From this time tI0 fuel is therefore no longer actively injected into the combustion chambers of the cylinders CY1 to CYn inclusive by the injectors. The time characteristic of the activation/deactivation status of the fuel injection system IS is illustrated in FIG. 5 by the switching curve GI0. As of the time tI0 the fuel injection system AC2 switches from the active state into the deactivated state. From this time tI0 the engine speed N is observed in step P3 and compared with a reference speed decrease which would normally result if all the injectors were leak-tight. This speed rundown in the case of ideal leak-tightness of all injectors is illustrated in FIG. 5 by an unbroken curve G01 which starts at the engine switch-off speed MN, in particular at roughly the idling speed of the engine. It is observed during a third observation time window OP0 in the period between the time tI0 of the deactivation of all injectors IN1 to INn inclusive and the time tS0 of the deactivation of the ignition system IS, which does not follow until later, whether a deviation has occurred between the actual speed decrease and the reference speed curve GOI. To that end a check is made in step P4 to determine whether the speed N lies above a calibration threshold DT0. This is shown in FIG. 5 in the third observation time window OP0 above the speed values of the reference speed curve G01. The position of the calibration threshold DT0 may be advantageously chosen so far above the ideal, injector-leakage-free speed curve G01 that speed tolerances due to different design, control and/or regulating conditions of the combustion engine such as, for example, its internal friction, its cylinder settings during the switch-off operation, the amount of load to which it is subjected e.g. due to switching-off of the vehicle on a gradient or on the level, etc., are also taken into account.

The time characteristic of the status between activation and deactivation of the ignition system IS is illustrated in FIG. 5 by the switching status curve GS0 for the ignition system IS. The curve shows that the ignition system IS is activated during the third observation time window OP0. If it is registered by the diagnostic unit DI in step P4 of FIG. 4 that the speed N of the combustion engine CE during the third observation time window OP0 lies above the calibration threshold DT0, then this deviation indicates as the fault pattern a leaking or lack of leak-tightness of at least one injector. Shown by way of example in FIG. 5 is a speed decrease curve G01 when an injector leakage is present, said curve being represented by a dash-dotted line and running above the curve G01. The detection of the injector leakage fault is illustrated in FIG. 4 in the fault branch Z3 by the block P6. The fault "injector leakage during engine switch-off" is registered or detected and to indicate this an error bit is set in step P7. Finally, the diagnosis in respect of injector leakage during engine switch-off is stopped in step P8.

If it is recognized in step P4 that the engine speed N in the third observation time window OP0 lies below the calibration threshold DT0, it is checked in the diagnostic branch Z4 in step P5 whether the ignition system IS—as in this case as of time tS0—has been switched off and the engine is already stopped, i.e. its crankshaft is stationary and consequently the speed is N=0 or close to zero Rpm. While this is not the case, the speed N is observed in the third observation time window OP0 recursively, i.e. repeatedly, via the feedback branch Z5 in steps P3 and P4. When the engine is finally at a standstill, the diagnosis is terminated in step P8.

If no engine switch-off operation has been activated, which is checked in step P1, the diagnostic sequence of FIG. 4 jumps via a jump branch Z2 directly to step P8 and stops there.

To sum up, therefore, in the first instance the engine position of the combustion engine may be advantageously detected in particular during engine startup, e.g. via crankshaft and camshaft sensors, preferably from the first gap in the combustion engine's crankshaft position sensor disk. Then the ignition is activated starting with the next cylinder. Since direct injection engines only permit a sequential start injection, a first speed increase also takes place for the first cylinder for which fuel is injected. However, if beforehand there is already a speed increase and consequently a deviation occurs relative to the speed curve when no injector leakage is present, before fuel has been injected for this cylinder, then this deviation in the speed curve indicates an injector leakage, since an ignitable hydrocarbon (=HC) concentration has already formed in its combustion chamber due to leaking fuel. To test for injector leakage it is useful in this case in particular to exclude the possibility that a repeated cold start is involved, since such speed increases can occur in this situation also. It is therefore worthwhile to make certain that before the test for injector leakage at engine startup is started, the speed N has first dropped as close as possible to zero or is equal to zero Rpm, i.e. the crankshaft is stationary. If the engine speed was not yet essentially equal to or virtually zero Rpm at the start of the test, the diagnosis in respect of injector leakage may be advantageously aborted.

In the second instance, the speed curve is observed when the engine is switched off after all fuel injections have been stopped. If the speed decreases continuously until the engine has stopped, no injector leakage is present. If it is recognized or detected after all fuel injections have been stopped that the speed does not drop constantly, but increases briefly or does not decrease so rapidly, as would ideally be the case when no injector leakage is present, then there is reason to suspect a subsequent leaking of fuel into at least one cylinder that is not leak-tight. For this purpose the curve of the engine speed is observed during an observation time window when the engine is switched off. To that end it is beneficially ensured that the fuel injection process has previously been stopped completely in all cylinders, that thereafter a minimum waiting period has been allowed to elapse before the diagnosis is activated, and that the ignition is still active during the diagnostic period, i.e. the observation time window. In this way it can be detected within a certain range of tolerance whether injector leakage is present or not. The tolerance range may be advantageously chosen such that the fuel input is sufficiently large to allow the diagnosis of a speed increase relative to the reference speed curve. In particular the switch-off time for the diagnosis during engine switch-off may be advantageously chosen to be sufficiently long to allow an ignitable mixture to form in the first place in the combustion chamber associated with an injector in the event of a possible leakage of said injector. A reference speed curve at engine startup or switch-off time is stored in the control device, which reference speed curve is characteristic of a deceleration of the crankshaft in the absence of injector leakage. If the actually observed speed decrease when the engine is switched off during the observation time window deviates by a predefinable threshold, the leakage of at least one injector is indicated. In this way, therefore, defective components or an operating state with unacceptable emissions can be detected e.g. in garage workshops or indicated to the driver of the vehicle by means of a fault indicating device such as e.g. a fault warning lamp.

The beneficial diagnostic methods explained above with reference to FIGS. 1 to 5 for detecting injector leakage in a spark ignition engine with direct gasoline injection can, of course, advantageously be implemented also in other combustion engines with direct fuel injection such as e.g. in diesel engines. In addition to or independently of this, they can advantageously be used also for a combustion engine which has one or more injectors for a port injection in its at least one intake manifold.

What is claimed is:

1. A method for diagnosing the leakage of an injector which serves for injecting fuel into a combustion chamber of at least one cylinder of a combustion engine, the method comprising the steps of:

in an observation time window during which the particular injector of the combustion engine that is to be tested is deactivated, detecting whether a deviation of a speed curve of the combustion engine has occurred relative to a reference speed curve which indicates injector leak-tightness, and in the event that a deviation is detected, determining that there is a leakage of said injector.

2. The method according to claim 1, wherein in a first observation time window which lies in a period of time between an activation time of a starter unit of the combustion engine for the purpose of rotating its crankshaft and an activation time of an ignition system of the combustion engine, an engine speed of the combustion engine is observed during the latter's starting operation, and in said first observation time window a leakage of the particular injector that is to be tested is diagnosed if a speed increase above a calibration threshold is registered in the first observation time window, said calibration threshold being chosen greater than a target speed of the combustion engine attainable by the starter unit on its own.

3. The method according to claim 1, wherein in a second observation time window which lies in a period of time between the activation time of the ignition system of the combustion engine and an activation time of an injection control system of the combustion engine, an engine speed of the combustion engine is observed during the latter's starting operation, and a leakage of the particular injector that is to be tested is diagnosed if a speed increase above a calibration threshold is registered in the second observation time window, said calibration threshold being chosen greater than a target speed of the combustion engine attainable by a starter unit on its own.

4. The method according to claim 1, wherein the diagnosis is stopped as soon as the fuel injection of at least one injector is released.

5. The method according to claim 1, wherein during a third observation time window which lies in the period of time between a time of a deactivation of all injectors of the combustion engine and a time of the deactivation of the ignition system of the combustion engine, the decrease in an engine speed is observed, and the leakage of the particular injector that is to be tested is diagnosed if during said third observation time window the engine speed exceeds a calibration threshold which is greater than the values of the engine speed if the injector is leak-tight.

6. A control device for diagnosing the leakage of an injector which serves for injecting fuel into the combustion chamber of at least one cylinder of a combustion engine, comprising:

a diagnostic unit operable to detect, in an observation time window during which the particular injector of the combustion engine that is to be tested is deactivated, whether a deviation of a speed curve of the combustion engine has occurred relative to a reference speed curve which indicates injector leak-tightness, and in the event that a deviation is detected, is further operable to determine that there is a leakage of said injector.

7. The device according to claim 6, wherein the diagnostic unit is further operable to observe, in a first observation time window which lies in a period of time between an activation time of a starter unit of the combustion engine for the purpose of rotating its crankshaft and an activation time of an ignition system of the combustion engine, an engine speed of the combustion engine during the latter's starting operation, and to diagnose in said first observation time window a leakage of the particular injector that is to be tested if a speed increase above a calibration threshold is registered in the first observation time window, wherein said calibration threshold is chosen greater than a target speed of the combustion engine attainable by the starter unit on its own.

8. The device according to claim 6, wherein the diagnostic unit is further operable to observe, in a second observation time window which lies in a period of time between the activation time of the ignition system of the combustion engine and an activation time of an injection control system of the combustion engine, an engine speed of the combustion engine during the latter's starting operation, and to diagnose a leakage of the particular injector that is to be tested if a speed increase above a calibration threshold is registered in the second observation time window, wherein said calibration threshold is chosen greater than a target speed of the combustion engine attainable by a starter unit on its own.

9. The device according to claim 6, wherein the diagnostic unit is further operable to stop the diagnosis as soon as the fuel injection of at least one injector is released.

10. The device according to claim 6, wherein the diagnostic unit is further operable to observe, during a third observation time window which lies in the period of time between a time of a deactivation of all injectors of the combustion engine and a time of the deactivation of the ignition system of the combustion engine, the decrease in an engine speed, and to diagnose the leakage of the particular injector that is to be tested if during said third observation time window the engine speed exceeds a calibration threshold which is greater than the values of the engine speed if the injector is leak-tight.

* * * * *